United States Patent [19]
Sinclair et al.

[11] Patent Number: 5,940,222
[45] Date of Patent: Aug. 17, 1999

[54] CATADIOPTRIC ZOOM LENS ASSEMBLIES

[75] Inventors: Robert Lawrence Sinclair, East York, Canada; Russell M. Hudyma, San Ramon, Calif.

[73] Assignee: Wescam Inc., Flamborough, Canada

[21] Appl. No.: 08/958,600

[22] Filed: Oct. 27, 1997

[51] Int. Cl.[6] ............ G02B 15/14; G02B 17/00
[52] U.S. Cl. ............ 359/689; 359/676; 359/691; 359/726; 359/729
[58] Field of Search ............ 359/691, 686, 359/689, 726–736, 676

[56] References Cited

U.S. PATENT DOCUMENTS

| | | | |
|---|---|---|---|
| 3,529,888 | 9/1970 | Buchroeder | 359/686 |
| 4,235,508 | 11/1980 | Kaprelian | 359/366 |
| 4,971,428 | 11/1990 | Moskovich | 359/366 |
| 5,089,910 | 2/1992 | Sigler | 359/399 |
| 5,114,238 | 5/1992 | Sigler | 359/399 |
| 5,161,051 | 11/1992 | Whitney et al. | 359/351 |

Primary Examiner—Scott J. Sugarman
Attorney, Agent, or Firm—Rogers & Scott

[57] ABSTRACT

A catadioptric zoom lens assembly has a catoptric objective lens group with a forwardly facing primary mirror and a rearwardly facing first surface reflecting secondary mirror located forwardly of the primary mirror to create an intermediate image forwardly of the primary mirror. A zoom relay lens group is located optically rearwardly of the intermediate image and has a stationary field lens subgroup, a first movable lens subgroup and a second movable lens subgroup.

15 Claims, 8 Drawing Sheets ( FOCAL LENGTH 600 mm )

(FOCAL LENGTH 600 mm)

(FOCAL LENGTH 1900 mm)

(FOCAL LENGTH 600 mm)

(FOCAL LENGTH 600 mm)

CATADIOPTRIC ZOOM LENS ASSEMBLIES

BACKGROUND OF THE INVENTION

Many forms of catadioptric lens assemblies have been used to achieve a relatively long focal length in a compact assembly. When a zoom or multi-focal length capability is required, it is known to locate a refractive zoom relay lens group after an intermediate image formed by a catadioptric objective lens group. In such known lens assemblies, the objective lens group and the refractive zoom relay group have been individually corrected to reduce the overall impact of optical abberations on image quality. However, to achieve such individual corrections, it is known to provide the objective lens group with large refractive corrector lenses in front thereof and/or fixed lens groups within the converging beam in advance of the intermediate image. Such lens assemblies are well known, and are shown for example in U.S. Pat. No. 4,235,508 (Kaprelian) and U.S. Pat. No. 4,971,428 (Moskovich).

If such refractive corrector lenses are not provided, the overall resolving power of the lens assembly is reduced and the operating f/number is restricted to values greater than f/10.0 to achieve reasonable optical performance. Such lens assemblies are also well known and are described for example in U.S. Pat. No. 3,529,888 (Buchroeder), see FIG. 4.

OBJECT OF THE INVENTION

It is therefore an object of the present invention to provide an improved catadioptric zoom lens assembly which substantially overcomes the above mentioned disadvantages of known zoom lens assemblies of this kind.

SUMMARY OF THE INVENTION

According to the invention, a catadioptric zoom lens assembly includes a catoptric objective lens group having a forwardly facing primary mirror and a rearwardly facing first surface reflecting secondary mirror located forwardly of the primary mirror to create an intermediate image forwardly of the primary mirror, and a zoom relay lens group located optically rearwardly of the intermediate image and having a stationary field lens subgroup, a first movable lens subgroup and a second movable lens subgroup.

A catadioptric zoom lens assembly in accordance with the invention is capable of achieving focal lengths in excess of one meter, can be produced in an ultracompact form, and can be capable of providing near diffraction limited performance at relatively long focal lengths and large relative apertures and formats without the use of refractive correctors or field elements in the objective lens group.

The stationary field lens subgroup may function to correct aberrations produced by the catoptric objective lens group. The first movable lens subgroup may function as a positive variator providing the bulk of the zoom action while providing primary correction for spherical aberration in the relay subgroup, and the second movable lens subgroup may function as a negative compensator and balance residual aberrations produced by the stationary fixed lens subgroup and the first movable lens subgroup.

The stationary fixed lens subgroup may include an aspherical lens and a doublet lens. Alternatively, the stationary fixed lens subgroup may include two doublet lenses or a graded index lens and a doublet lens.

The zoom lens assembly may have a ratio of maximum effective focal length to overall lens assembly length of at least about 7.75, may have a ratio of back focal length to overall lens assembly length of at least about 0.2, and a ratio of effective focal length of the objective lens group to overall lens assembly length equal to or less than about 1.

Each refractive subgroup may utilize anomalous dispersion glasses for colour correction over a wide spectral band extending from about 400 to about 1100 nm.

The zoom lens assembly may have an objective lens group which operates at a speed of less than F/2.25, and an obscuration ratio of less than 0.3. The two movable lens subgroups may provide both focal length variations and focus adjustment, and the power of the first movable lens subgroup may be over 3.5 times the absolute power of the second movable lens subgroup.

BRIEF DESCRIPTION OF THE DRAWINGS

Embodiments of the invention will now be described, by way of example only, with reference to the accompanying drawings, of which:

Referring to the accompanying drawings, FIGS. 1 to 3 show a catadioptric zoom lens assembly in accordance with a first embodiment of the invention and comprising a catoptric objective lens group G1 and a zoom relay lens group G2.

The catoptric objective lens group G1 has a forwardly facing parabolic primary mirror $M_1$ and a hyperbolic rearwardly facing secondary mirror $M_2$, i.e. a first surface reflecting mirror, located forwardly of the primary mirror $M_1$ to create an intermediate image II forwardly of the primary mirror $M_1$. In this embodiment, the catoptric objective lens group G1 operates at F/2.0 with an effective focal length of approximately 402 mm. The zoom relay lens group G2 is located optically downwardly of the intermediate image II and comprises a stationary field lens subgroup G21, a first movable lens subgroup G22 and a second movable lens subgroup G23. The zoom relay lens group G2 is followed by an image rotator (fold prism) FP and a compensating glass block GB for a 3CCD (charge coupled device) colour camera.

Figure 4:
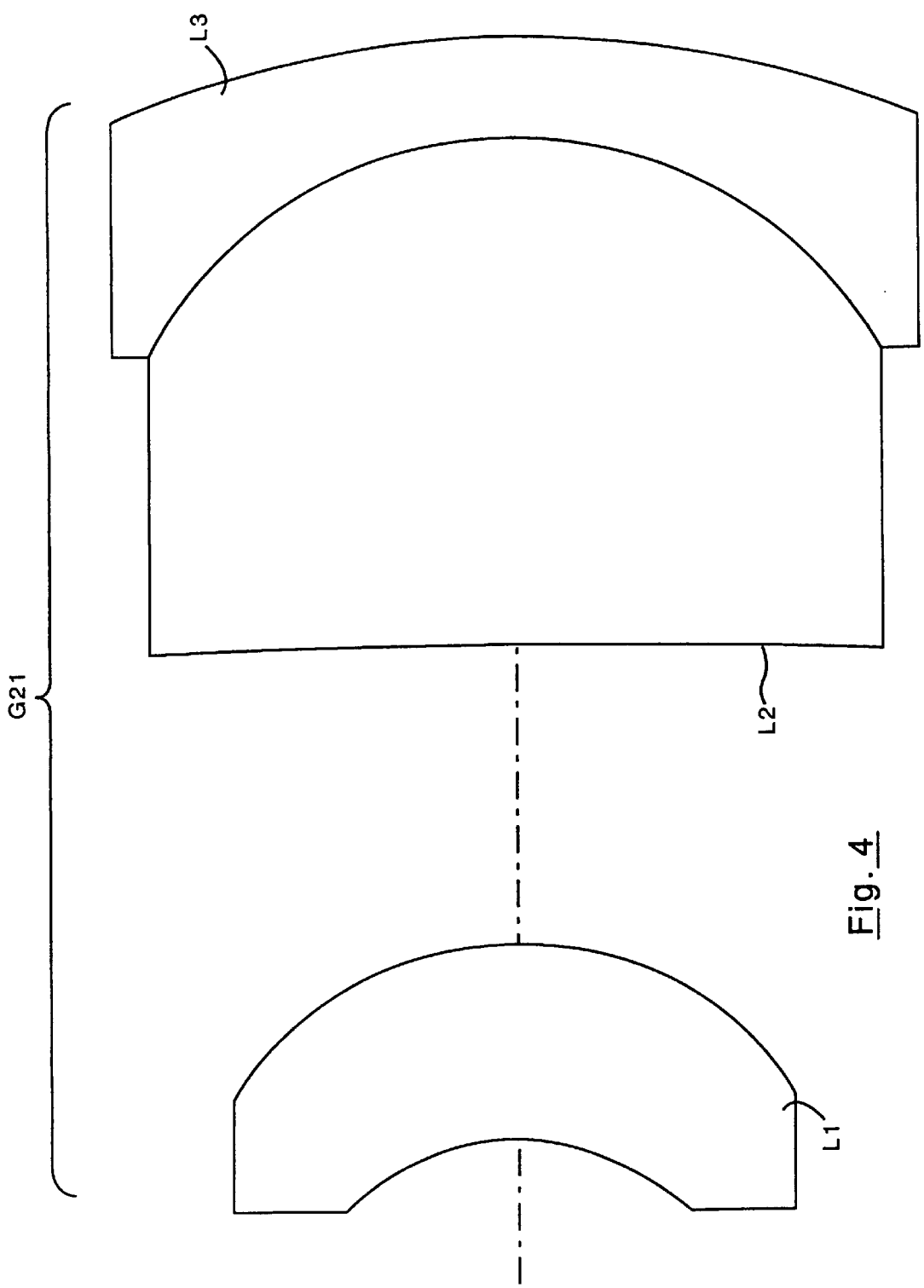
FIG. 4 is a similar view, but on an enlarged scale, of the stationary field lens group of the embodiment shown in FIGS. 1 to 3.

The stationary field lens subgroup G21 is located after the intermediate image II and functions to correct aberrations produced by the catoptric objective lens group G1. In this embodiment, the stationary field lens group G21 (see also FIG. 4) comprises an aspheric surface lens L1 and a doublet lens L2, L3. The aspheric lens L1 includes an aspheric surface to provide a potent method for correcting the aberrations introduced by the objective lens group G1. In this embodiment, the asphere is a conic surface applied to the first surface of the overall negative meniscus lens L1. A person skilled in the art will also readily appreciate that this aspheric surface could be applied to either surface of the first element and could be converted from a simple conic to a generalized asphere. The positive cemented doublet lens L2, L3 has an overall biconvex shape and combines with lens L1 to form the positive stationary field lens group G21.

The aspheric surface lens L1 corrects aberrations introduced by the catoptric objective lens group G1. For positive field angles, the aspheric surface lens L1 adds a positive or overcorrected component to the third order coma sum, thus providing substantial correction of residual uncorrected (or negative) third order coma, with resultant improved axial and off axis modulation transfer function (MTF), especially at the short end of the zoom focal length range.

The first movable lens subgroup G22 functions as a positive variator providing optical power and primary correction for spherical aberration and, in this embodiment, includes lenses L4, L5, L6, L7 and L8. The lens subgroup G22 consists of three closely spaced components. The first component is a weak meniscus cemented doublet consisting of lenses L4 and L5 which provide approximately ⅙ of the G22 lens power. Lens L6 (the second component) is a biconvex singlet which provides approximately ⅔ of the G22 lens power. The third component is also a cemented doublet consisting of lens elements L7 and L8. This biconvex element provides approximately ⅙ of the total G22 lens power while contributing significantly to the overall lens spherical aberration correction. The overall complexity of these three biconvex lens components is due primarily by the need to correction spherical, coma and chromatic aberrations at the short end of the zoom lens where the overall catadioptric zoom relay is operating at its maximum speed.

The second movable lens subgroup G23 functions as a negative compensator and balances residual aberrations produced by the stationary field lens subgroup G21 and the first movable lens subgroup G22 and, in this embodiment, include lenses L9 and L10. In this embodiment, the compensator L9, L10 consists of a simple cemented doublet with an overall negative power which is less than ⅓ the power of the first moving subgroup G21.

Figure 1:
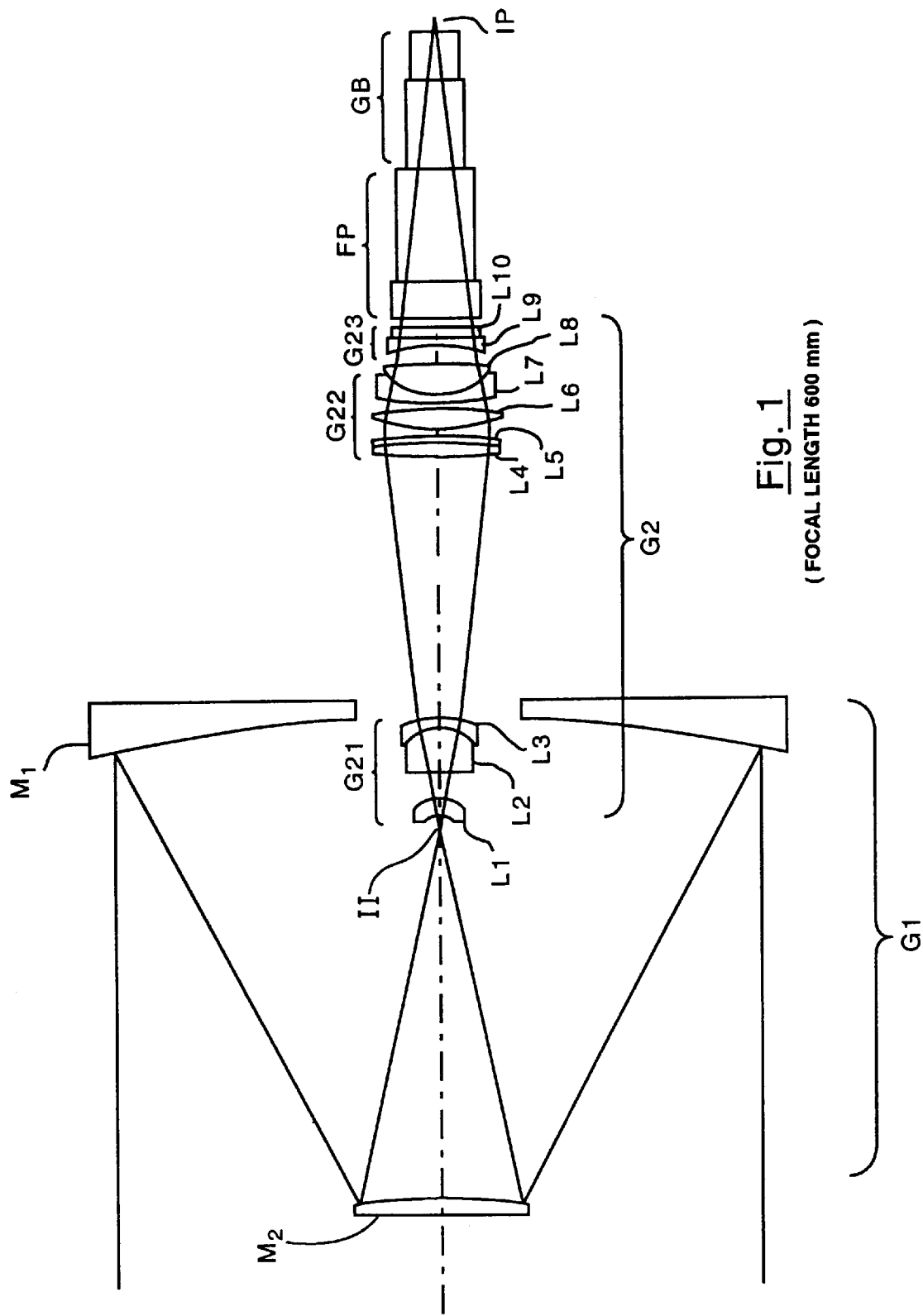
FIG. 1 is a diametric view of a zoom lens assembly in accordance with one embodiment of the invention, and showing the zoom relay lens group positioned to provide an effective focal length of 600 mm.
Figure 2:
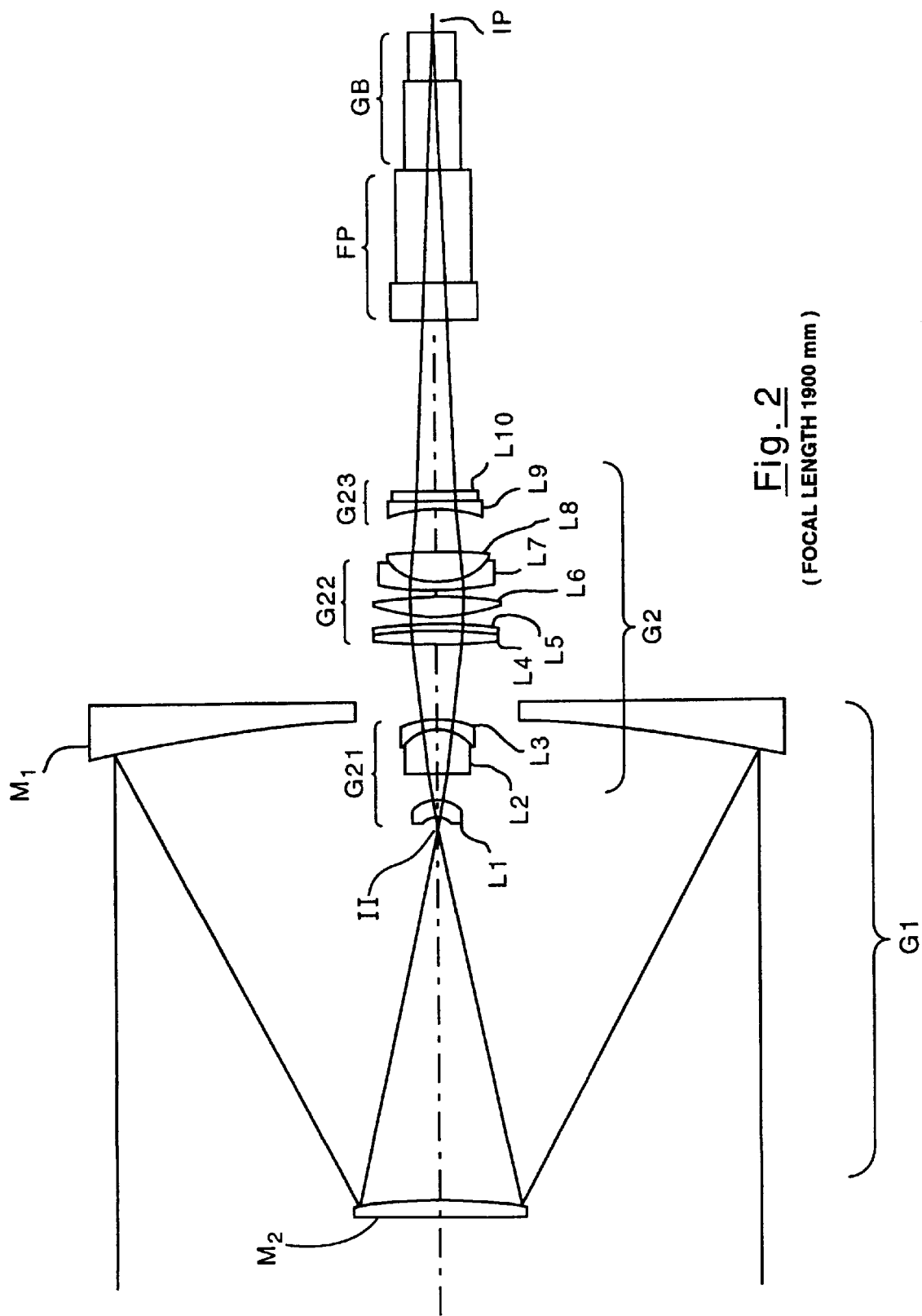
FIG. 2 is a similar view but showing the zoom relay lens group positioned to provide an effective focal length of 1900 mm.
Figure 3:
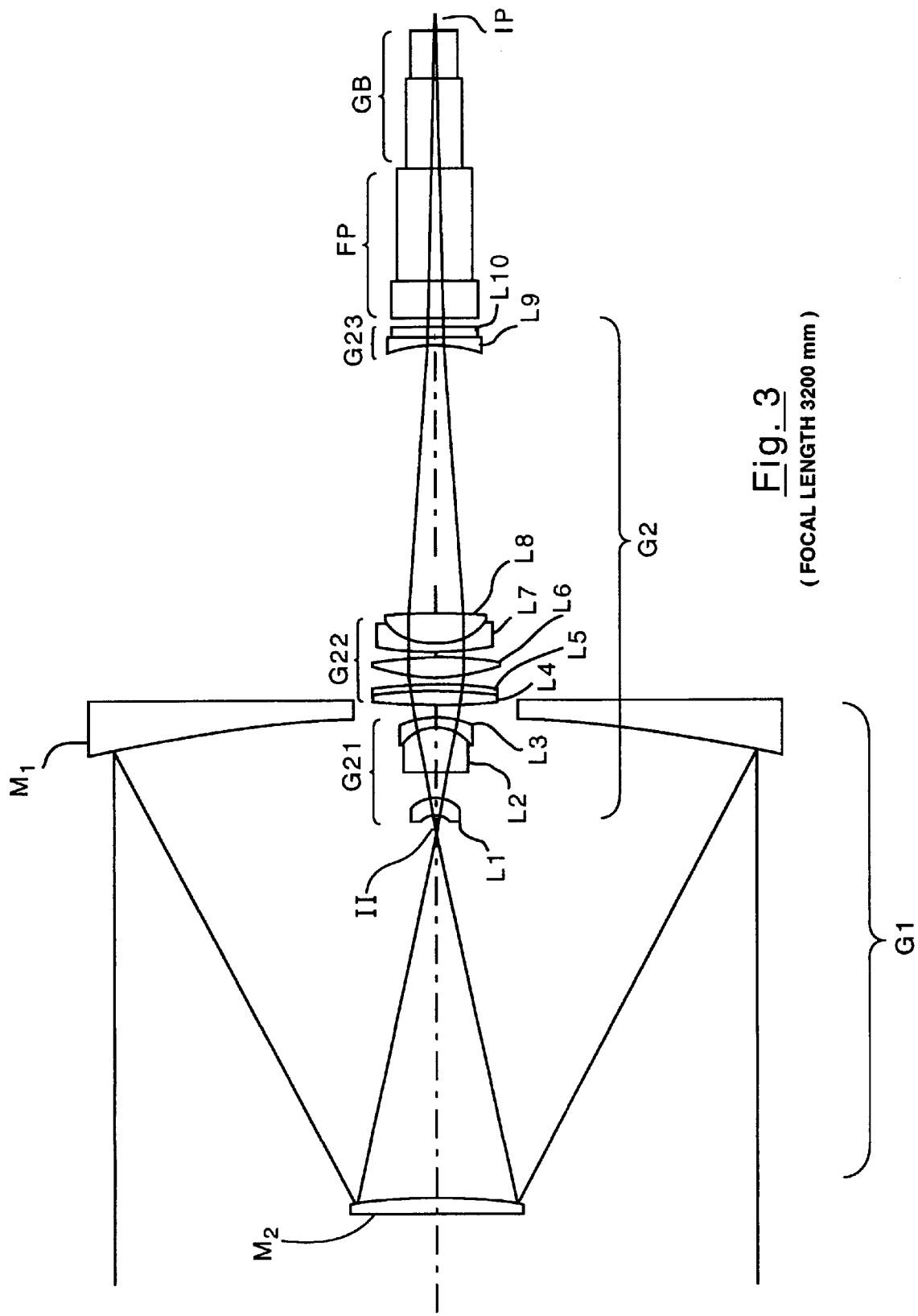
FIG. 3 is a similar view but showing the zoom relay lens group positioned to provide an effective focal length of 3200 mm.

Operation of the zoom lens assembly will be readily apparent to a person skilled in the art. FIGS. 1, 2 and 3 show the positions of the first movable lens subgroup G22 and the second movable lens subgroup G23 to provide effective focal lengths of 600 mm, 1900 mm and 3200 mm respectively. The image rotator FP and compensating glass block GB support the integration of 3 CCD cameras and/or to fold the zoom lens assembly to reduce the overall length and support simultaneous viewing by multiple imaging sensors.

A person skilled in the art will also readily appreciate that a catadioptric zoom lens assembly in accordance with the invention is more compact than known catadioptric zoom lens assemblies. For example, with the present invention, a maximum focal length of 3200 mm can be achieved by a zoom lens assembly which is only 394 mm long, while maintaining a 200 mm entrance pupil diameter.

Unlike most catadioptric zoom lenses which are colour corrected only for the visible spectrum (450 to 600 nm), this improved design expands the operating spectral band by over a factor greater than 4. By employing anomalous dispersion glasses, the operating spectral band can be extended from 450 nm to over 1100 nm. In this case, each refractive lens group is individually colour corrected by matching the appropriate materials.

The primary mirror radius and mirror separation is selected to maintain the obscuration ratio less than 0.3. The aperture stop resides on the secondary mirror with the objective lens group operating at a speed of less than F/2.25. The reimaging lens has a very long focal length which is achieved within a very compact envelope. The overall length (OAL) from the secondary mirror vertex to the image plane is less than $0.13f_{eff}$. The back focal length is very large, typically greater than 0.2 times the OAL.

The zoom lens relay lens is composed of only two moving groups which simultaneously provide a focal length change and lens focus function. The power of the relay ranges from 1.5 to 8 which equates to an overall zoom relay power of 5.33. The predominate change in magnification is due to the strong power of the positive first zoom group. The power of the first group is 3.5 times larger than the power of the compensating second group.

A specific example of a catadioptric zoom lens assembly in accordance with the above described embodiment is given in the following table I. The radii are positive and negative in accordance with standard convention which assumes that positive directions extend from left to right. The individual lens elements are identified together with the front and rear radii except in the case of the mirror which are both front surface reflectors. The lens spacings and thicknesses are described next followed by the lens material. The lens material is identified by the refractive index N and the dispersion V. The zoom lens spacings, F/number and focal length are described in a separate sub-table. The lens has been scaled for a 200 mm diameter entrance pupil and an 11 mm diagonal image plane format.

TABLE I

| | Single Asphere | | | | |
|---|---|---|---|---|---|
| ELEMENT | RADIUS OF CURVATURE | | | | |
| NUMBER | FRONT | BACK | THICKNESS | N | v |
| OBJECT | INF | | INFINITY | | |
| M1 | | A(1) | 150.0000 | REFL | |
| | | | −159.7406 | | |
| M2 | | A(2) | 127.0005 | REFL | |
| L1 | A(3) | −9.0246 CX | 5.7755 | 1.670 | 47.1 |
| | | | 8.7577 | | |
| L2 | −140.7635 CC | −11.2018 CX | 15.0000 | 1.438 | 94.9 |
| L3 | −11.2818 CC | −27.0990 CX | 3.0000 | 1.558 | 54.1 |
| | | | 90.9132*1 | | |
| L4 | 260.0330 CX | −106.2585 CX | 5.1650 | 1.438 | 94.9 |
| L5 | −106.2585 CC | −186.5325 CX | 2.5000 | 1.558 | 54.1 |
| | | | 1.0000 | | |

TABLE I-continued

|  | Single Asphere | | | | |
|---|---|---|---|---|---|
| L6 | 43.9105 CX | −91.1651 CX | 7.8116 | 1.438 | 94.9 |
|  |  |  | 1.0000 |  |  |
| L7 | 82.3824 CX | 20.6050 CC | 2.5000 | 1.558 | 54.1 |
| L8 | 30.6050 CX | −122.9296 CX | 9.7747 | 1.438 | 94.9 |
|  |  |  | 4.0000*2 |  |  |
| L9 | −45.4795 CC | 203.3380 CC | 2.5000 | 1.438 | 94.9 |
| L10 | 203.3380 CX | −195.6349 CX | 3.3017 | 1.558 | 54.1 |
|  |  |  | 2.0000*3 |  |  |
| FP | INF | INF | 12.5000 | 1.516 | 64.1 |
|  | INF | INF | 37.5000 | 1.516 | 64.1 |
|  |  |  | 0.1000 |  |  |
| GB | INF | INF | 30.0000 | 1.603 | 38.0 |
|  | INF | INF | 16.2000 | 1.516 | 64.1 |
|  | IMAGE DISTANCE = |  | 5.7998 |  |  |
| IMAGE | INF |  |  |  |  |

NOTES
Positive radius indicates the center of curvature is to the right
Negative radius indicates the center of curvature is to the left
Dimensions are given in millimeters
Thickness is axial distance to next surface

ASPHERIC CONSTANTS $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

| ASPHERIC | CURV | K |
|---|---|---|
| A(1) | −0.00236856 | −1.000000 |
| A(2) | −0.00563329 | −5.974761 |
| A(3) | −0.16376692 | −0.499454 |

| *ZOOM PARAMETERS | POS. 1 | POS. 2 | POS. 3 | EFL | F/No. |
|---|---|---|---|---|---|
| *1 = | 90.9132 | 25.4140 | 4.0000 | 600 | 3.0 |
| *2 = | 4.0000 | 14.9275 | 90.9132 | 1900 | 9.5 |
| *3 = | 2.0000 | 56.5726 | 2.0000 | 3200 | 16.0 |

In the above example, the ratio of the maximum effective focal length to overall lens assembly length is 7.86, the ratio of the back focal length to the overall lens assembly length is 0.29, and the ratio of the effective focal length of the objective lens group G1 to the overall lens assembly length is 1.0.

Figure 5:
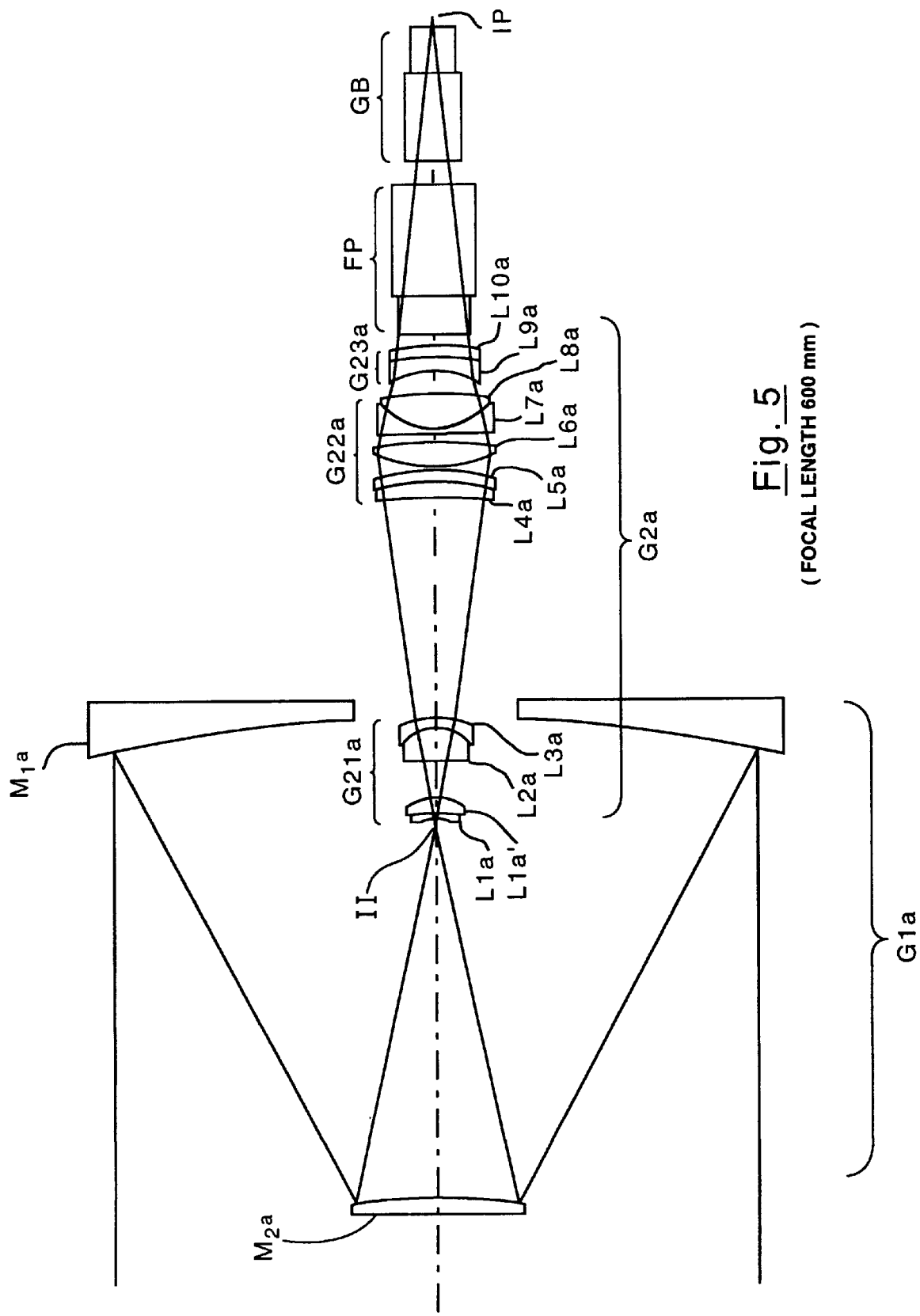
FIG. 5 is a diagrammatic view of a zoom lens assembly in accordance with a second embodiment of the invention.
Figure 6:
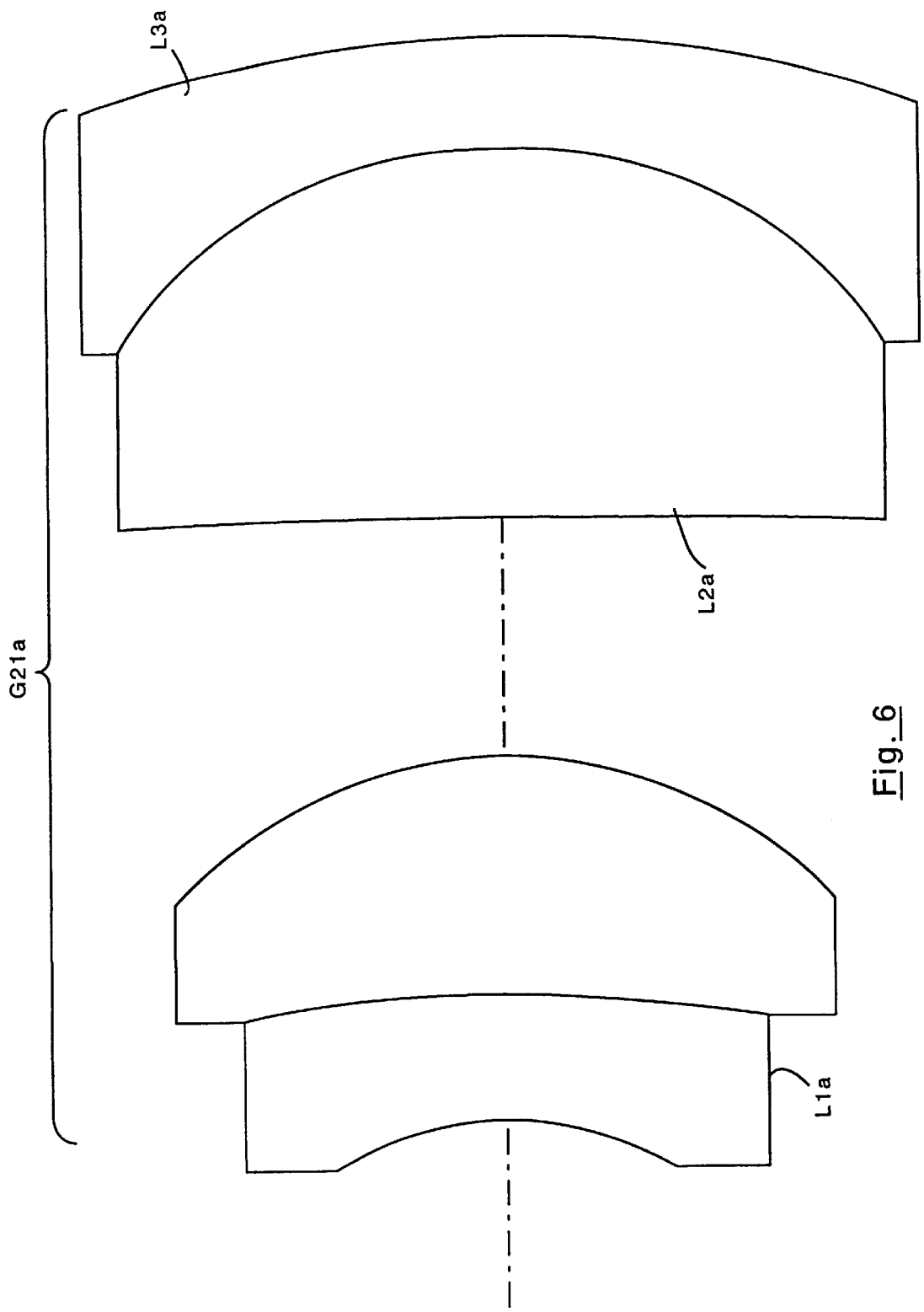
FIG. 6 is a similar view, but on an enlarged scale, of the stationary field lens group of the embodiment shown in FIG. 5.

FIGS. 5 and 6 show another embodiment with a different stationary field lens subgroup G21a. In FIGS. 5 and 6, the subgroup G21a consists of two cemented meniscus doublets. The first doublet consisting of lenses L1a and L1a' provides almost ⅔ of the total subgroup power. The lens consists of conventional glasses since its proximity to the intermediate image minimizes its overall impact on the lens colour correction. The second doublet consisting of lenses L2a and L3a is also a positive meniscus element which utilizes anomalous dispersion glasses to ensure wideband colour correction is maintained.

A specific example of a catadoptric zoom lens assembly in accordance with the embodiment shown in FIGS. 5 and 6 is given in the following Table II. Since most of the lens elements in Table II have characteristics different from those in Table I, the elements in Table II have been given the same reference letters and numbers as the corresponding elements in Table I but with the addition of the suffix "a".

TABLE II

|  | Two Doublets | | | | |
|---|---|---|---|---|---|
| ELEMENT | RADIUS OF CURVATURE | | | | |
| NUMBER | FRONT | BACK | THICKNESS | N | v |
| M1a |  | A(1) | −158.7500 | REFL |  |
| M2a |  | A(2) | 105.2300 | REFL |  |
| L1a | −8.5000 CC | −34.7768 CX | 3.5000 | 1.717 | 29.5 |
| L1a' | −34.7768 CC | −10.8449 CX | 6.5000 | 1.670 | 47.1 |
|  |  |  | 6.6527 |  |  |
| L2a | −199.1567 CC | −11.8026 CX | 10.0000 | 1.438 | 94.9 |

TABLE II-continued

Two Doublets

| | | | | | |
|---|---|---|---|---|---|
| L3a | −11.8026 CC | −31.8803 CX | 3.0000 | 1.558 | 54.1 |
| | | | 103.9696*1 | | |
| L4a | −150.6013 CC | −72.8013 CX | 5.1650 | 1.438 | 94.9 |
| L5a | −72.8013 CC | −104.8341 CX | 3.0000 | 1.558 | 54.1 |
| | | | 1.0000 | | |
| L6a | 40.2247 CX | −102.3383 CX | 9.6700 | 1.438 | 94.9 |
| | | | 1.0000 | | |
| L7a | 128.1979 CX | 22.7906 CC | 3.0000 | 1.558 | 54.1 |
| L8a | 22.7906 CX | −95.6686 CX | 12.0000 | 1.438 | 94.9 |
| | | | 6.9232*2 | | |
| L9a | −32.4758 CC | −178.3732 CX | 4.0000 | 1.438 | 94.9 |
| L10a | −178.3732 CC | −62.2693 CX | 5.0000 | 1.558 | 54.1 |
| | | | 2.3896*3 | | |
| FP | INF | INF | 12.5000 | 1.516 | 64.1 |
| | INF | INF | 37.5000 | 1.516 | 64.1 |
| | | | 8.0000 | | |
| GB | INF | INF | 30.0000 | 1.603 | 38.0 |
| | INF | INF | 16.2000 | 1.516 | 64.1 |
| | IMAGE DISTANCE = | | 5.7998 | | |

NOTES
Positive radius indicates the center of curvature is to the right
Negative radius indicates the center of curvature is to the left
Dimensions are given in millimeters
Thickness is axial distance to next surface

ASPHERIC CONSTANTS $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

| ASPHERIC | CURV | K |
|---|---|---|
| A(1) | −0.00237203 | −1.000000 |
| A(2) | −0.00455995 | −10.139924 |

| *ZOOM PARAMETERS | POS. 1 | POS. 2 | POS. 3 | EFL | F/No. |
|---|---|---|---|---|---|
| *1 = | 103.9696 | 27.6510 | 4.0000 | 600 | 3.0 |
| *2 = | 6.9232 | 17.9878 | 105.2295 | 1900 | 9.5 |
| *3 = | 2.3896 | 67.6435 | 4.0529 | 3200 | 16.0 |

Figure 7:
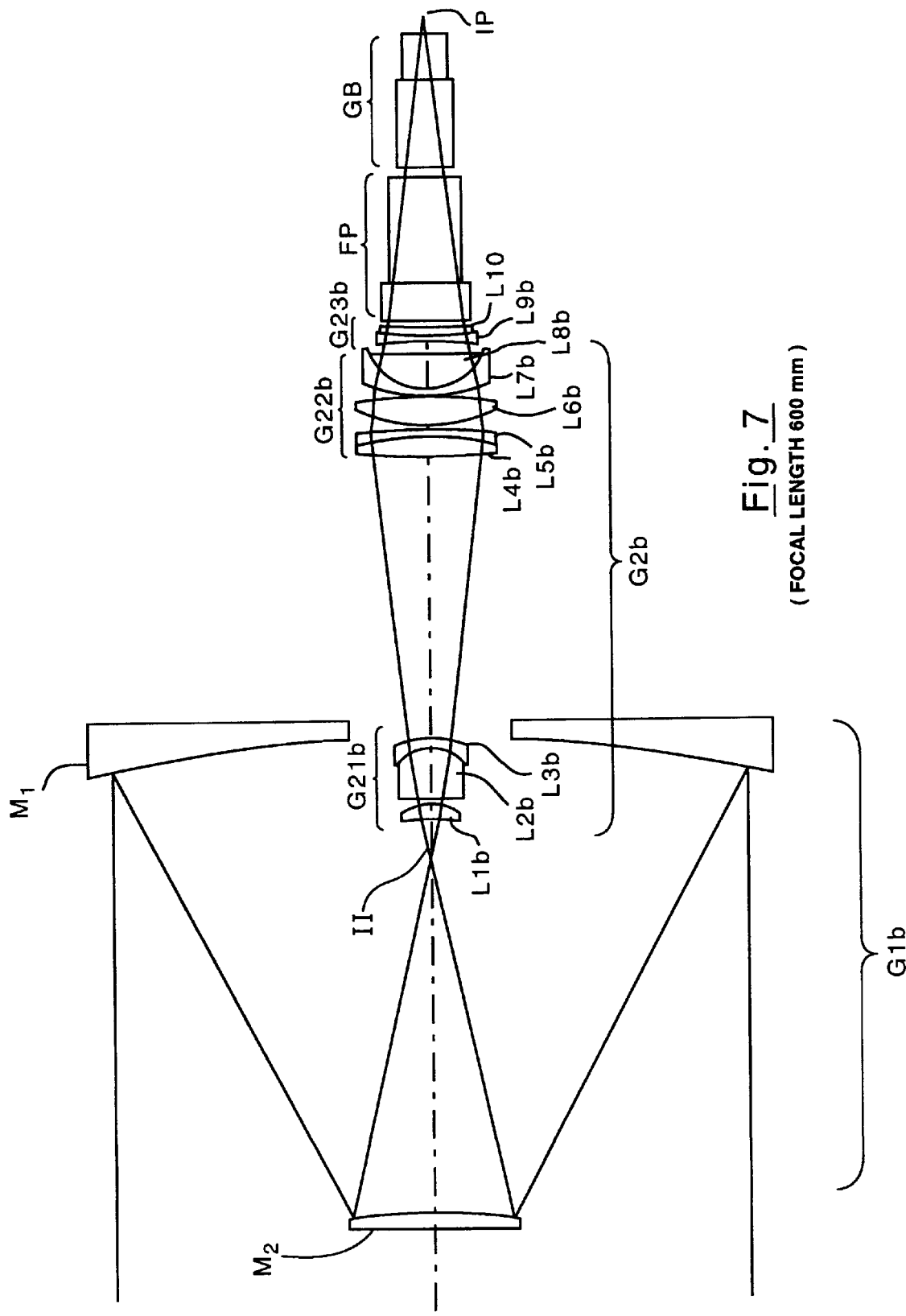
FIG. 7 is a diagrammatic view of a zoom lens assembly in accordance with a third embodiment of the invention.
Figure 8:
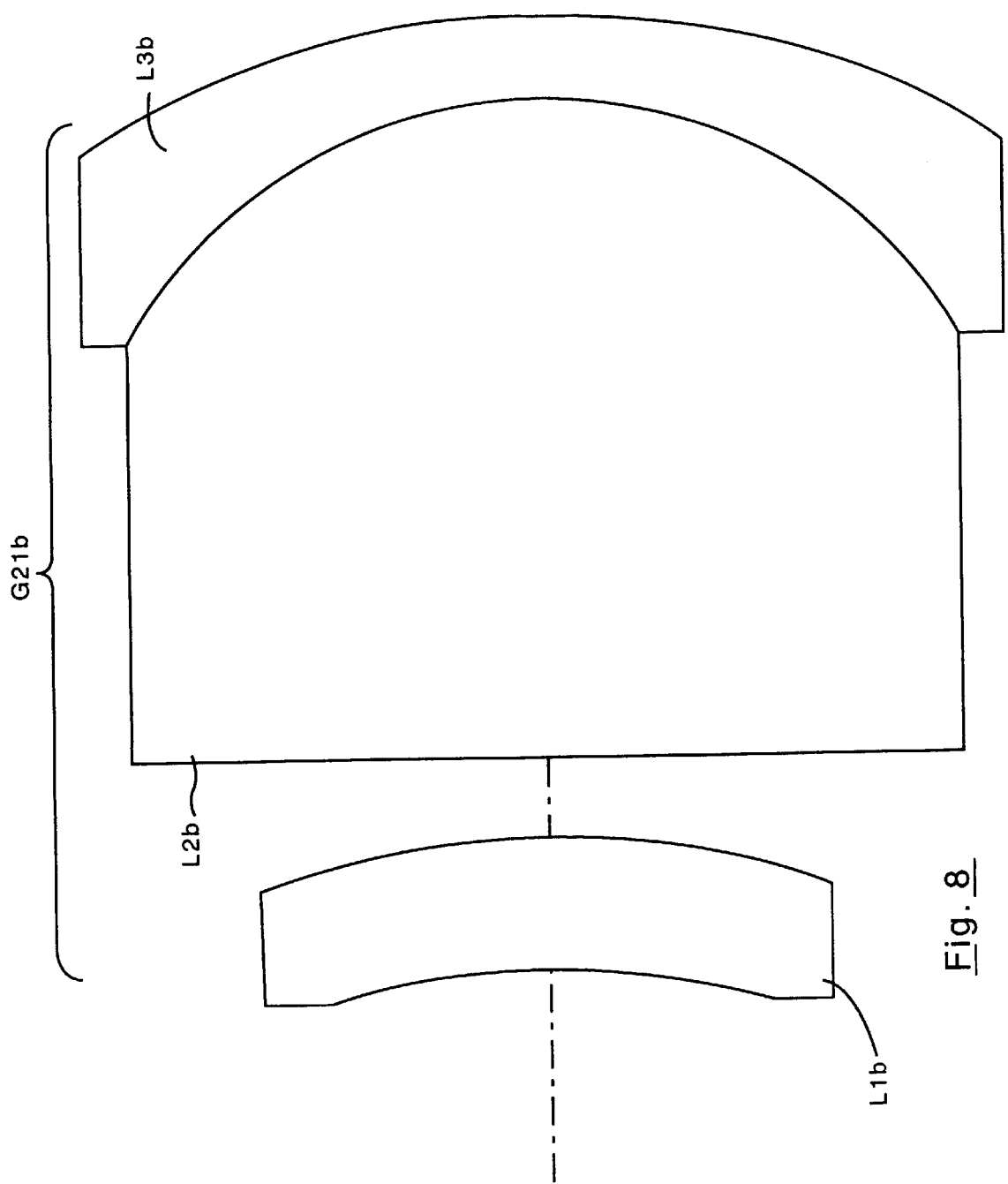
FIG. 8 is a similar view, but on an enlarged scale, of the stationary field lens group of the embodiment shown in FIG. 7.

FIGS. 7 and 8 show a still further embodiment with another different stationary field lens subgroup G21b. In FIGS. 7 and 8, the subgroup G21b consists of a graded index singlet L1b and a cemented doublet L2b and L3b. The graded index singlet material is Gradium 3 which is an axial gradient lens material available from Lightpath Technologies Corporation. A person skilled in the art will readily appreciate that other axial gradient materials can be used to achieve similar aberration correction. The cemented doublet is a weak meniscus which is colour corrected using anomalous dispersion glasses.

A specific example of a catadioptric zoom lens assembly in accordance with the embodiment shown in FIGS. 7 and 8 is given in the following Table III. Since most of the lens elements in Table II have characteristics different from those in Table I (and Table II), the elements in Table III have been given the same reference letters and numbers as the corresponding lens elements in Table I but with the addition of the suffix (b).

TABLE III

Graded Index Element

| ELEMENT NUMBER | RADIUS OF CURVATURE | | THICKNESS | N | v |
|---|---|---|---|---|---|
| | FRONT | BACK | | | |
| M1b | | A(1) | −158.8481 | REFL | |
| M2b | | A(2) | 131.4084 | REFL | |
| L1b | A(3) | −22.2241 CX | 3.9618 | G(1) | |
| L2b | −367.5272 CC | −13.6054 CX | 20.0000 | 1.438 | 94.9 |
| L3b | −13.6054 CC | −24.5375 CX | 2.5000 | 1.558 | 54.1 |
| | | | 97.4084*1 | | |

TABLE III-continued

Graded Index Element

| | | | | | |
|---|---|---|---|---|---|
| L4b | 243.2546 CX | −92.5164 CX | 7.0000 | 1.438 | 94.9 |
| L5b | −92.5164 CC | −161.0862 CX | 2.5000 | 1.558 | 54.1 |
| | | | 1.0000 | | |
| L6b | 45.4224 CX | −159.7222 CX | 10.0000 | 1.438 | 94.9 |
| | | | 0.1000 | | |
| L7b | 49.4748 CX | 19.6228 CC | 2.5000 | 1.558 | 54.1 |
| L8b | 19.6228 CX | 126.1262 CC | 13.0302 | 1.438 | 94.9 |
| | | | 4.0000*2 | | |
| L9b | −128.5765 CC | 108.6123 CC | 2.5000 | 1.438 | 94.9 |
| L10b | 108.6123 CX | 222.9375 CC | 3.0748 | 1.558 | 54.1 |
| | | | 2.0000*3 | | |
| FP | INF | INF | 12.5000 | 1.516 | 64.1 |
| | INF | INF | 37.5000 | 1.516 | 64.1 |
| | | | 4.0770 | | |
| GB | INF | INF | 30.0000 | 1.603 | 38.0 |
| | INF | INF | 16.2000 | 1.516 | 64.1 |
| | IMAGE DISTANCE = | | 5.7998 | | |

NOTES
Positive radius indicates the center of curvature is to the right
Negative radius indicates the center of curvature is to the left
Dimensions are given in millimeters
Thickness is axial distance to next surface

GRADIENT INDEX MATERIAL

User-Defined Gradient

G(1) Gradium B, with a negative gradient and an offset of 3.705 mm

ASPHERIC CONSTANTS $$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

| ASPHERIC | CURV | K |
|---|---|---|
| A(1) | −0.00236572 | −1.00000 |
| A(2) | −0.00530592 | −6.538984 |
| A(3) | −0.05116692 | −0.000000 |

| *ZOOM PARAMETERS | POS. 1 | POS. 2 | POS. 3 | EFL | F/No. |
|---|---|---|---|---|---|
| *1 = | 97.4084 | 26.2500 | 4.0000 | 600 | 3.0 |
| *2 = | 4.0000 | 14.9980 | 97.4084 | 1900 | 9.5 |
| *3 = | 2.0000 | 62.1594 | 2.0000 | 3200 | 16.0 |

In the examples illustrated in Tables I, II and III extensive use of Ohara's FPL53 in combination with Schott's KzFSN2 has been employed to achieve satisfactory wideband performance. A person skilled in the art will also readily appreciate that other combinations of anomalous dispersion glasses can also be combined to achieve comparable wideband colour correction.

Other embodiments and examples of the invention will be readily apparent to a person skilled in the art, the scope of the invention being defined in the appended claims.

We claim:

1. A catadioptric zoom lens assembly including:
   a catoptric objective lens group having a forwardly facing primary mirror and a rearwardly facing first surface reflecting secondary mirror located forwardly of the primary mirror to create an intermediate image forwardly of the primary mirror, and
   a zoom relay lens group located optically rearwardly of the intermediate image and having a stationary field lens subgroup, a first movable lens subgroup and a second movable lens subgroup.

2. A zoom lens assembly according to claim 1 wherein the stationary field lens subgroup functions to correct abberations produced by the catadoptric objective lens group.

3. A zoom lens assembly according to claim 1 wherein the first movable lens subgroup functions as a positive variator providing the bulk of the zoom action while providing primary correction spherical aberration in the relay subgroup.

4. A zoom lens assembly according to claim 1 wherein the second movable lens subgroup functions as a negative compensator and balances residual aberrations produced by the stationary field lens subgroup and the first movable lens subgroup.

5. A zoom lens assembly according to claim 1 wherein the stationary field lens subgroup includes an aspheric lens and a doublet lens.

6. A zoom lens assembly according to claim 1 wherein the stationary field lens subgroup includes two doublet lenses.

7. A zoom lens assembly according to claim 1 wherein the stationary field lens subgroup includes a graded index lens and a doublet lens.

8. A zoom lens assembly according to claim 1 having a ratio of maximum effective focal length to overall lens assembly length of at least about 7.75.

9. A zoom lens assembly according to claim 1 having a ratio of back focal length to overall lens assembly length of at least about 0.2.

10. A zoom lens assembly according to claim 1 having a ratio of effective focal length of the objective lens group to overall lens assembly length equal to or less than about 1.

11. A zoom lens assembly according to claim 1 wherein each refractory subgroup includes anomalous dispersion glasses for colour correction over a wide spectral band extending from about 400 to about 1100 nm.

12. A zoom lens assembly according to claim 1 having an objective lens group which operates at a speed of less than F/2.25.

13. A zoom lens assembly according to claim 1 having an obscuration ratio of less than 0.3.

14. A zoom lens assembly according to claim 1 wherein the two movable lens subgroups provide both focal length variation and focus adjustment.

15. A zoom lens assembly according to claim 1 wherein the power of the first movable lens subgroup is over 3.5 times the absolute power of the second movable lens subgroup.

* * * * *